(12) United States Patent
Kageyama et al.

(10) Patent No.: US 9,979,042 B2
(45) Date of Patent: May 22, 2018

(54) FUEL CELL STACK

(71) Applicant: Nissan Motor Co., Ltd., Yokohama-shi, Kanagawa (JP)

(72) Inventors: Kazuhiro Kageyama, Yokohama (JP); Mitsutaka Abe, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days. days.

(21) Appl. No.: 14/408,299

(22) PCT Filed: Jun. 28, 2013

(86) PCT No.: PCT/JP2013/067925
§ 371 (c)(1),
(2) Date: Dec. 16, 2014

(87) PCT Pub. No.: WO2014/007182
PCT Pub. Date: Jan. 9, 2014

(65) Prior Publication Data
US 2015/0140466 A1 May 21, 2015

(30) Foreign Application Priority Data
Jul. 2, 2012 (JP) ................................. 2012-148855

(51) Int. Cl.
*H01M 8/24* (2016.01)
*H01M 8/10* (2016.01)
(Continued)

(52) U.S. Cl.
CPC ....... *H01M 8/2485* (2013.01); *H01M 8/0273* (2013.01); *H01M 8/0284* (2013.01); *H01M 8/0297* (2013.01); *H01M 8/1004* (2013.01); *H01M 8/242* (2013.01); *H01M 8/247* (2013.01); *H01M 2008/1095* (2013.01)

(58) Field of Classification Search
None
See application file for complete search history.

(56) References Cited

U.S. PATENT DOCUMENTS 7,276,310 B2 * 10/2007 Kobayashi ............ H01M 8/242
429/483
2004/0137307 A1 * 7/2004 Okonogi ............. H01M 8/0271
429/511

(Continued)

FOREIGN PATENT DOCUMENTS

CN 102484264 A 5/2012
DE 102009039900 A1 3/2011
(Continued)

*Primary Examiner* — Ula C Ruddock
*Assistant Examiner* — Amanda Barrow
(74) *Attorney, Agent, or Firm* — Global IP Counselors, LLP

(57) ABSTRACT

A fuel cell stack includes bonding members for joining projecting sections of adjacent frames in cell modules, an inter-cell module seal member forming a seal between the cell modules, and supporting members disposed between adjacent frames in the cell modules. As viewed from above in the direction in which the cell modules are layered, the supporting members overlap at least a part of a section of the inter-cell module seal member that contacts the cell modules.

17 Claims, 6 Drawing Sheets

(51) Int. Cl.
*H01M 8/02* (2016.01)
*H01M 8/2485* (2016.01)
*H01M 8/242* (2016.01)
*H01M 8/247* (2016.01)
*H01M 8/0273* (2016.01)
*H01M 8/0284* (2016.01)
*H01M 8/0297* (2016.01)
*H01M 8/1004* (2016.01)
*H01M 8/1018* (2016.01)

(56) References Cited

U.S. PATENT DOCUMENTS

| | | | | |
|---|---|---|---|---|
| 2005/0112442 A1* | 5/2005 | Wells | ........... | H01M 8/0271 |
| | | | | 429/535 |
| 2006/0177722 A1* | 8/2006 | Inagaki | ........... | H01M 8/0271 |
| | | | | 429/434 |
| 2009/0004539 A1 | 1/2009 | Ishikawa et al. | | |
| 2009/0136811 A1* | 5/2009 | Kusakabe | ........... | H01M 8/0273 |
| | | | | 429/492 |
| 2009/0239128 A1* | 9/2009 | Keyser | ........... | H01M 8/0204 |
| | | | | 429/432 |
| 2011/0111320 A1* | 5/2011 | Suda | ........... | H01M 8/0276 |
| | | | | 429/465 |
| 2011/0229791 A1* | 9/2011 | Kageyama | ........... | H01M 8/242 |
| | | | | 429/469 |
| 2011/0236784 A1* | 9/2011 | Uehara | ........... | H01M 8/0273 |
| | | | | 429/469 |
| 2012/0156584 A1* | 6/2012 | Uehara | ........... | H01M 8/0247 |
| | | | | 429/465 |
| 2012/0178011 A1* | 7/2012 | Sugiura | ........... | H01M 8/0273 |
| | | | | 429/457 |
| 2015/0050577 A1* | 2/2015 | Numao | ........... | H01M 8/2485 |
| | | | | 429/460 |

FOREIGN PATENT DOCUMENTS

| | | | | | |
|---|---|---|---|---|---|
| JP | 2005-183358 A | | 7/2005 | | |
| JP | 2006-172752 A | | 6/2006 | | |
| JP | 2007-273113 | * | 10/2007 | ........... | H01M 8/24 |
| JP | 2007-273113 A | | 10/2007 | | |
| JP | 2010-80222 A | | 4/2010 | | |
| JP | 2010-123377 A | | 6/2010 | | |
| JP | 2010-251153 A | | 11/2010 | | |
| JP | 2012-146522 A | | 8/2012 | | |
| WO | WO 2010/058258 | * | 5/2010 | ........... | H01M 8/02 |
| WO | 2011/114811 A1 | | 9/2011 | | |
| WO | WO 2011/114811 | * | 9/2011 | ........... | H01M 8/02 |

* cited by examiner

US 9,979,042 B2

FUEL CELL STACK

CROSS-REFERENCE TO RELATED APPLICATIONS

This application is a U.S. National stage application of International Application No. PCT/JP2013/067925, filed Jun. 28, 2013, which claims priority to Japanese Patent Application No. 2012-148855 filed in Japan on Jul. 2, 2012, the contents of each of which are hereby incorporated herein by reference.

BACKGROUND

Field of the Invention
The present invention relates to a fuel cell stack.
Background Information
Fuel cells directly convert chemical energy to electrical energy through an electrochemical reaction using an anode gas such as hydrogen and a cathode gas such as air as reaction gases.

Japanese Laid-Open Patent Application No. 2010-123377 discloses a fuel cell unit including an electrically insulating frame, a membrane electrode assembly integrally formed with the frame, and a pair of separators disposed on both sides of the membrane electrode assembly and sandwiching the membrane electrode assembly therebetween. The fuel cell stack is formed by layering a plurality of fuel cell units. In this fuel cell stack, outer circumferential sections of adjacent frames are joined by bonding members, ensuring insulation between the interior and the exterior of the fuel cell stack.

Broadly speaking, there are two methods of assembling a fuel cell stack. The first method is to sequentially layer a plurality of fuel cell units to assemble the fuel cell stack in one step. The second method is to first layer a plurality of fuel cell units into cell modules, then layer a plurality of cell modules to assemble the fuel cell stack. Assembling a fuel cell stack according to this second method yields the advantage of allowing for a reduction in the number of steps in the assembly process (see Japanese Laid-Open Patent Application No. 2010-123377, paragraph 0057).

SUMMARY

When layering cell modules to assemble a fuel cell stack, inter-cell module seal members are disposed between the cell modules. The fuel cell stack is compressed in the fuel cell unit layering direction. For this reason, there is a demand for an arrangement that allows deformation of the fuel cell units in a cell module to be minimized even when subjected to reaction force from the inter-cell module seal members.

An object of the present invention is to provide a fuel cell stack that is assembled by layering a plurality of cell modules formed in advance by layering a plurality of fuel cell units, the stack allowing for the prevention of deformation in the fuel cell units in the cell modules even when subjected to a reaction force from inter-cell module seal members.

In order to achieve the object proposed above, the present invention is a fuel cell stack assembled by layering a plurality of cell modules formed in advance by layering a plurality of fuel cell units. The cell modules comprise at least two layered fuel cell units in which a membrane electrode assembly integrally formed with an electrically insulating frame is sandwiched between a pair of separators. The fuel cell stack comprises bonding members for joining outer circumferential sections of adjacent frames in the cell modules, an inter-cell module seal member disposed between the cell modules and forming a seal between the cell modules, and supporting members disposed between adjacent frames in the cell modules. Projecting sections are formed on a side of the outer circumferential section of the frames with respect to a layering direction, the bonding members being disposed between the projecting sections, and the supporting members being disposed between frame sections positioned further inward than the projecting sections. As viewed from above in the direction in which the cell modules are layered, the supporting members overlap at least a part of a section of the inter-cell module seal member that contacts the cell modules.

BRIEF DESCRIPTION OF THE DRAWINGS

Referring now to the attached drawings which form a part of this original disclosure.

DETAILED DESCRIPTION OF EMBODIMENTS

Figure 1:
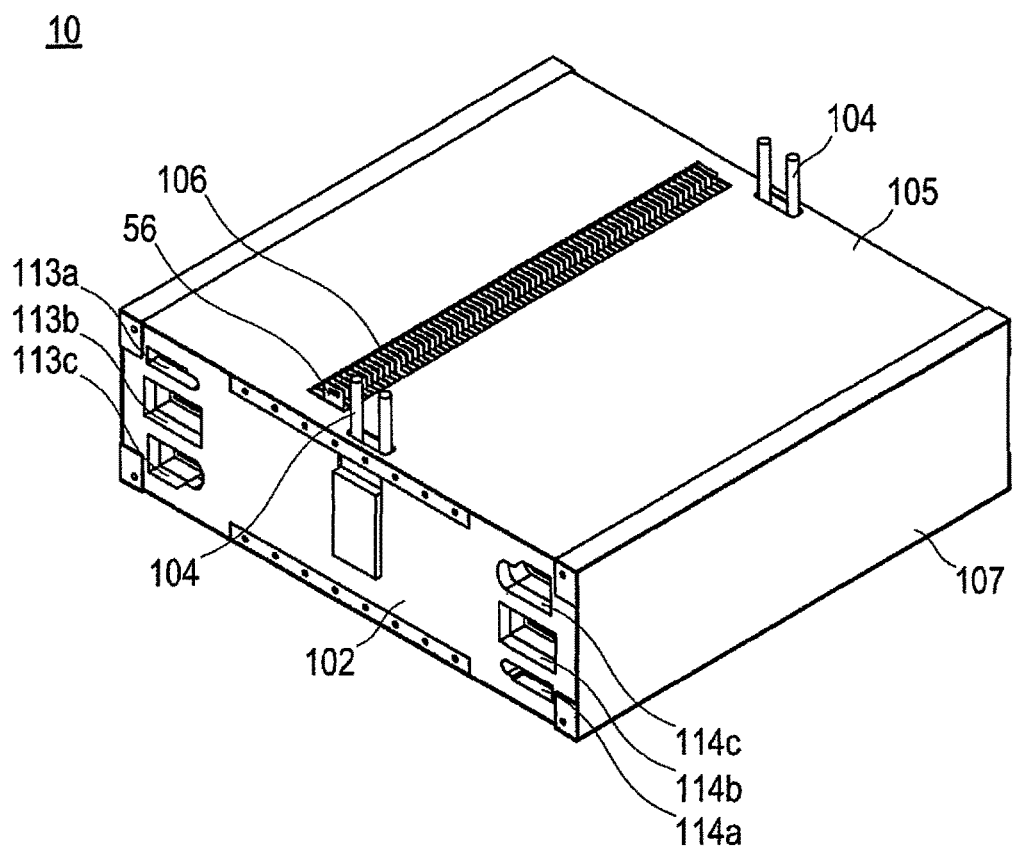
FIG. 1 is a perspective view of a fuel cell stack according to an embodiment.

An embodiment of the present invention will now be described with reference to the attached drawings. In the descriptions of the drawings, identical parts are assigned the same reference numerals, therefore redundant description thereof will be omitted. The dimensions and proportions shown in the drawings have been exaggerated for ease of illustration; the actual proportions differ.

Embodiment 1

Figure 2:
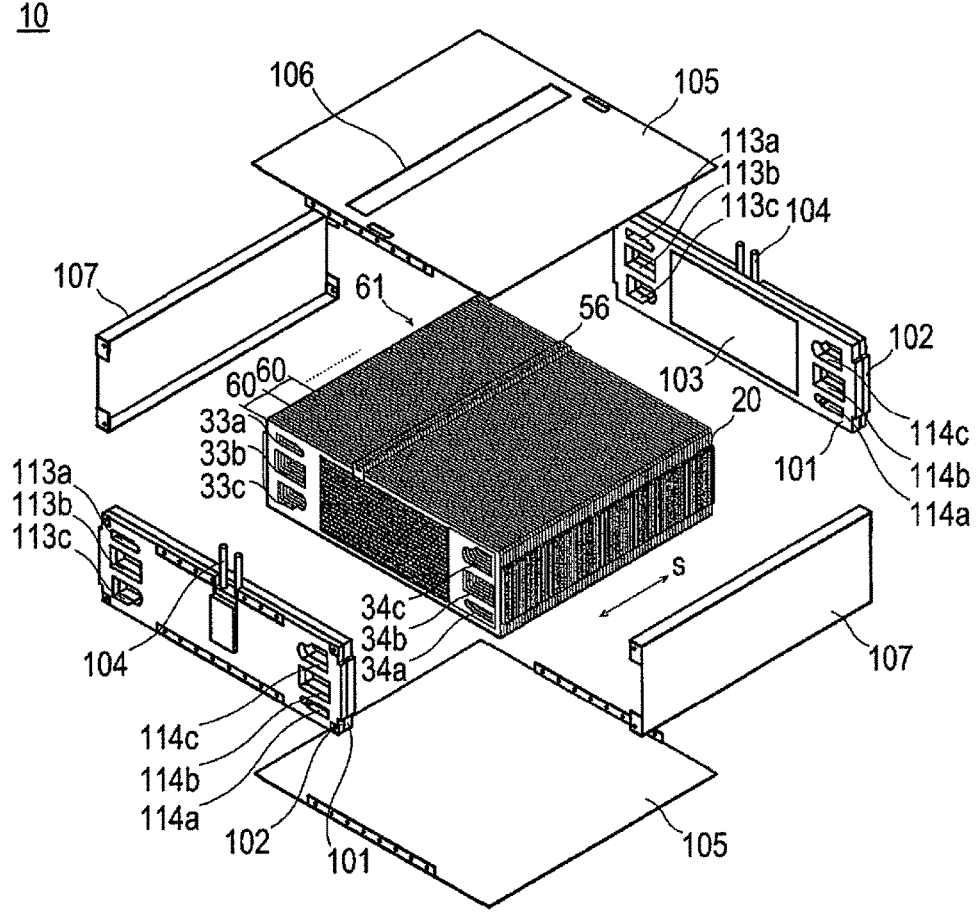
FIG. 2 is an exploded perspective view of the fuel cell stack shown in FIG. 1.
Figure 3:
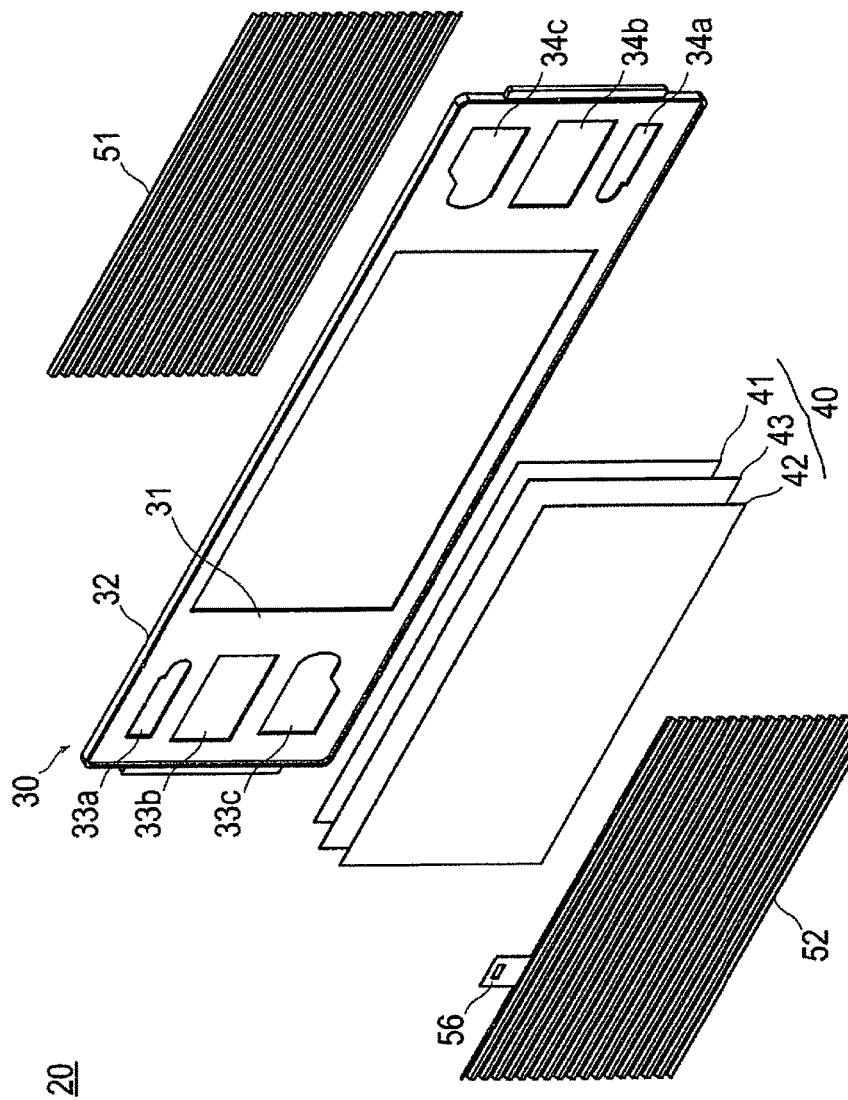
FIG. 3 is an exploded perspective view of a fuel cell unit.
Figure 4:
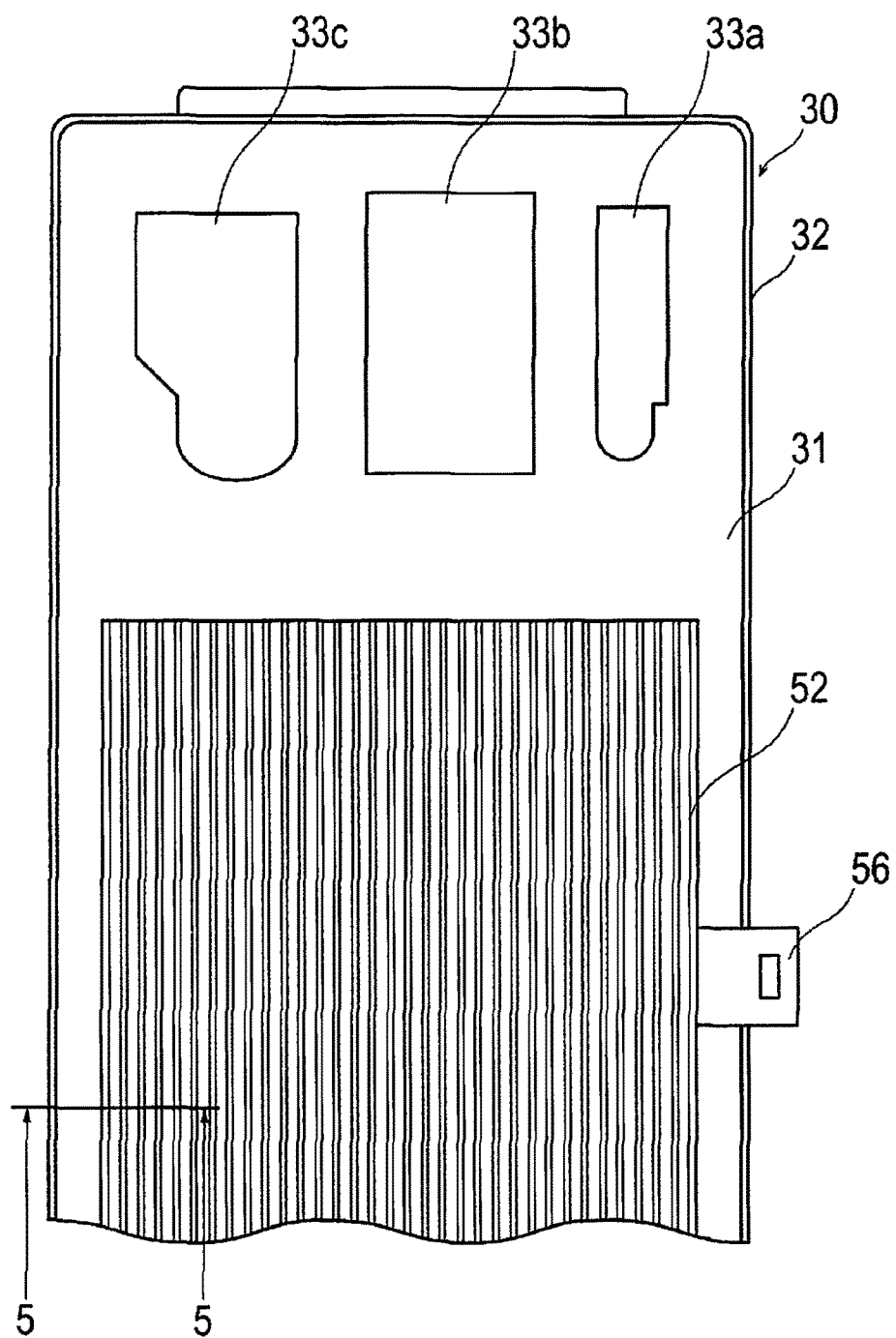
FIG. 4 is a front view of part of a cell module.
Figure 5:
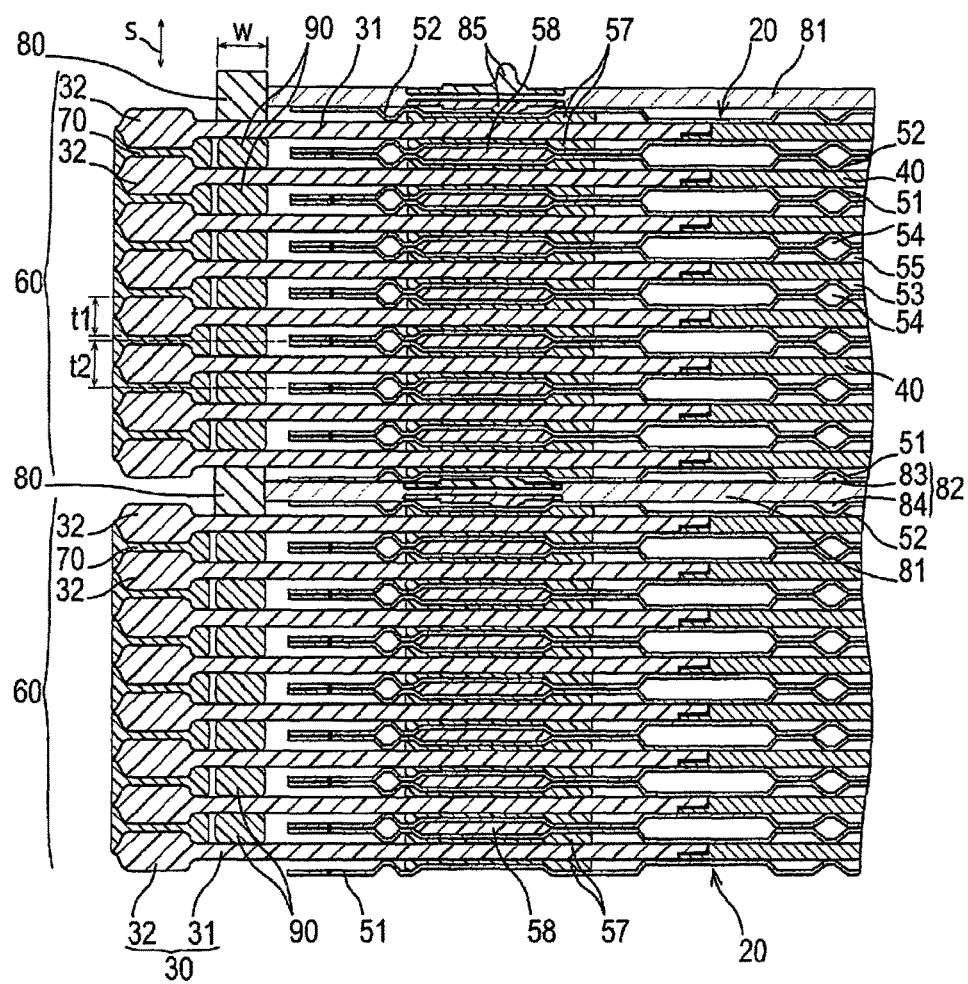
FIG. 5 is a sectional view of the main parts of the fuel cell stack of FIG. 4, along line 5-5 in FIG. 4.

FIG. 1 is a perspective view of a fuel cell stack 10. FIG. 2 is an exploded perspective view of the fuel cell stack 10 shown in FIG. 1. FIG. 3 is an exploded perspective view of a fuel cell unit 20. FIG. 4 is a front view of part of a cell module 60. FIG. 5 is a sectional view of the main parts of the fuel cell stack 10 according to a first embodiment along line 5-5 in FIG. 4.

To summarize the fuel cell stack 10 according to the present embodiment with reference to FIGS. 1 to 5, the fuel cell stack 10 is assembled by layering a plurality of cell modules 60 formed in advance by layering a plurality of fuel cell units 20. Each of the cell modules 60 comprises at least two layered fuel cell units 20. In FIG. 5, one cell module 60 comprises eight layered fuel cell units 20. Each fuel cell unit 20 comprises a membrane electrode assembly 40 that is integrally formed with an electrically insulating frame 30 and sandwiched between a pair of separators 51, 52. The fuel cell stack 10 further comprises bonding members 70 for joining outer circumferential sections of adjacent frames 30 in the cell modules 60, an inter-cell module seal member 80 disposed between the cell modules 60 and forming a seal between the cell modules 60, and supporting members 90 disposed between adjacent frames 30 in the cell modules 60. As viewed from above in a layering direction S in which the cell modules 60 are layered, the supporting members 90 of the fuel cell stack 10 overlap at least a part of a section of the inter-cell module seal member 80 that contacts the cell modules 60. The embodiment will now be described in detail. In the following description, the layering direction S in which the fuel cell units 20 and cell modules 60 are layered may simply be referred to as the layering direction. FIGS. 2 and 5 show the layering direction S.

Turning to FIGS. 1 and 2, the fuel cell stack 10 comprises a layered assembly 61 of a plurality of cell modules 60, an insulating plate 101 and an end plate 102 being disposed in the stated order at both ends of the layered assembly 61 with respect to the layering direction S. A current collector plate 103 for retrieving electrical power is bonded to each of the insulating plates 101. An output terminal 104 is electrically connected to each of the current collector plates 103. The pair of end plates 102 is held in place by a pair of tension plates 105. The respective fuel cell units 20 contained in the cell modules 60 are thus compressed in the layering direction S. A rectangular opening 106 into which voltage measurement terminals 56 provided in the fuel cell units 20 are inserted is formed in one of the tension plates 105. Guide plates 107 for minimizing shifting in the stack are disposed at side positions between the pair of tension plates 105.

Tension rods and nuts may also be used instead of the tension plates 105 to compress the fuel cell units 20 contained in the cell modules 60 in the layering direction S.

Turning to FIGS. 3 through 5, the fuel cell unit 20 comprises an electrically insulating frame 30, a membrane electrode assembly 40 integrally formed with the frame 30, and a pair of separators 51, 52 (anode separator 51 and cathode separator 52) sandwiching the membrane electrode assembly 40.

The membrane electrode assembly 40 is a membrane electrode assembly (MEA) formed by joining an anode 41 and a cathode 42 so as to face an electrolyte membrane 43.

The electrolyte membrane 43 is formed, for example, from a fluororesin or the like, and is an ion exchange membrane for conducting hydrogen ions. Because the electrolyte membrane 43 exhibits good electrical conductivity when wet, the anode and cathode gases of the fuel cell stack 10 are moistened.

The anode 41 is formed by layering an electrode catalyst layer, a water-repellent layer, and a gas diffusion layer on the side of the electrolyte membrane 43. The electrode catalyst layer comprises an electrode catalyst in which a catalytic component such as platinum is carried upon an electroconductive carrier, and a polyelectrolyte. The water-repellent layer is formed from a fluororesin or the like. The gas diffusion layer is formed from, for example, carbon cloth, carbon paper, or carbon felt.

The cathode 42, like the anode 41, is formed by layering an electrode catalyst layer, a water-repellent layer, and a gas diffusion layer in the stated order starting from the electrolyte membrane 43. The anode 41 and the cathode 42 are slightly smaller in size than the electrolyte membrane 43.

The frame 30 comprises a frame section 31 that holds the outer circumference of the membrane electrode assembly 40, and a projecting section 32 that projects from the outer circumferential section of the frame section 31 at both sides in the layering direction S (in FIG. 5, the vertical direction). The frame 30 is molded from electrically insulating resin, and is molded integrally with the membrane electrode assembly 40. The frame 30 is rectangular in shape, with the membrane electrode assembly 40 being disposed in a central section thereof. A cathode gas inlet 33a, a coolant inlet 33b, and an anode gas inlet 33c are formed as through-holes in one lengthwise end of the frame 30. A cathode gas outlet 34a, a coolant outlet 34b, and an anode gas outlet 34c are formed as through-holes in the other end. A cathode gas inlet 113a, a coolant inlet 113b, an anode gas inlet 113c, a cathode gas outlet 114a, a coolant outlet 114b, and an anode gas outlet 114c are also formed as through-holes in the insulating plates 101 and end plates 102 so as to communicate with the inlets 33a, 33b, 33c and outlets 34a, 34b, and 34c in the frame 30 (see FIGS. 1 and 2).

The anode separator 51 is joined to that surface of the frame 30 facing the anode 41. The anode separator 51 is constituted by a metal comprising an electroconductive material, and has the form of a thin sheet that is larger than the anode 41. The anode separator 51 is press-molded so as to comprise a plurality of raised and recessed sections aligned at constant intervals. The anode separator 51 forms an anode gas flow channel 53 for supplying anode gas to the anode 41 on the surface on the side contacting the anode 41. The anode separator 51 forms a coolant flow channel 54 through which coolant for cooling the cell module 60 flows on the surface on the side opposite that contacting the anode 41.

The cathode separator 52 is joined to that surface of the frame 30 that faces the cathode 42. The cathode separator 52 is constituted by a metal comprising an electroconductive material, and has the form of a thin sheet that is larger than the cathode 42. The cathode separator 52 is press-molded so as to comprise a plurality of raised and recessed sections aligned at constant intervals. The cathode separator 52 forms a cathode gas flow channel 55 for supplying cathode gas to the cathode 42 on the surface on the side contacting the cathode 42. The cathode separator 52 forms a coolant flow channel 54 through which coolant for cooling the cell module 60 flows on the surface on the side opposite that contacting the cathode 42.

The cathode separator 52 includes a voltage measurement terminal 56. The terminal 56 projects outward from the outer circumferential portion of the cathode separator 52. The voltage measurement terminal 56 may also be disposed on the anode separator 51.

Turning to FIG. 5, in the fuel cell unit 20, the frame sections 31 of the frames 30 and the anode separators 51, and the frame sections 31 and the cathode separators 52, are joined by seal members 57. For ease of description, the seal members 57 between the frame sections 31 and the separators 51, 52 will be referred to hereafter as first seal members 57. There is no particular limitation upon the material of the first seal members 57; a thermoset adhesive can be used.

Adjacent anode separators 51 and cathode separators 52 in the cell module 60 are joined by seal members 58. For ease of description, the seal members 58 between the anode separators 51 and cathode separators 52 will be referred to hereafter as second seal members 58. There is no particular limitation upon the material of the second seal members 58; a thermoset adhesive can be used, as in the case of the first seal members 57.

The outer circumferential sections of adjacent frames 30, i.e., the projecting sections 32, in the cell module 60 are joined by the bonding members 70. There is no particular limitation upon the material of the bonding members 70; a thermoset adhesive can be used, as in the cases of the first and second seal members 57, 58.

The thickness t1 of the projecting section 32 of the frame 30 with respect to the layering direction S is less than the thickness t2 of the fuel cell unit 20 with respect to the layering direction S. The thickness t2 of the fuel cell unit 20 is expressed as the sum of the thicknesses of the membrane electrode assembly 40, the anode separator 51, and the cathode separator 52 with respect to the layering direction S. Imparting the projecting section 32 with a thickness t1 that is less than the thickness t2 of the fuel cell units 20 prevents direct contact between projecting sections 30 of adjacent frames 30.

The frame section 31 of the frame 30 holds the outer circumference of the membrane electrode assembly 40, and the frame section 31 and the separators 51, 52 are joined by the first seal members 57. This minimizes the passage of water vapor formed within the membrane electrode assembly 40 between the frame 30 and the separators 51, 52. The spaces between the projecting sections 32 of adjacent frames 30 in the cell module 60 are filled by the bonding members 70, segregating the interior and the exterior of the cell module 60. This prevents leakage of water vapor to the exterior even if slight amounts of water vapor pass between the frame 30 and the separators 51, 52.

When the fuel cell is generating power, the electrolyte membrane 43 of the membrane electrode assembly 40 becomes wet, and the cell module 60 swells in the layering direction S. Because the spaces between the projecting sections 32 of adjacent frames 30 within the cell module 60 are filled by the bonding members 70, the bonding members 70 deform so that, when the cell module 60 is displaced in the layering direction S, the frames 30 conform to this displacement in the layering direction S. This prevents undue stress from acting upon the frames 30, minimizing the formation of cracks in the frames 30. As a result, there is no leakage of water vapor to the exterior of the cell module 60. In order to allow the bonding members 70 to deform so that the frames 30 conform to displacement in the layering direction S, an adhesive having a lower Young's modulus than the Young's modulus of the frames 30 when cured is preferably used for the bonding members 70. The Young's modulus of the bonding members 70 relative to the Young's modulus of the frames 30 can be set as appropriate, but is preferably, for example, 20 MPa or less.

An inter-cell module seal member 80 that forms a seal between cell modules 60 is disposed between cell modules 60. There is no particular limitation upon the material of the inter-cell module seal member 80; a thermoset adhesive can be used, as in the case of the bonding members 70.

In the present embodiment, the inter-cell module seal member 80 is attached to an outer circumferential section of a plate member 81. This allows for easier handling of the inter-cell module seal member 80.

Layering the cell modules 60 forms a fluid flow channel 82 between the cell modules 60. Thus, the inter-cell module seal member 80 also functions as a seal member for sealing the fluid flow channel 82. The fluid flow channel 82 is a coolant flow channel through which coolant flows. In FIG. 5, the plate member 81 is positioned between the anode separator 51 of the bottommost layer of the cell module 60 depicted in the upper half of the drawing and the cathode separator 52 of the topmost layer of the cell module 60 depicted in the lower half of the drawing. Thus, the fluid flow channel 82 specifically comprises a first flow channel 83 formed between the anode separator 51 and the plate member 81 and a second flow channel 84 formed between the cathode separator 52 and the plate member 81. A seal member 85 for sealing the first flow channel 83 and the second flow channel 84 is disposed on the plate member 81. For ease of description, the seal member 85 disposed on the plate member 81 will be referred to hereafter as the third seal member 85. There is no particular limitation upon the material of the third seal member 85; an elastic material such as rubber can be used. When the cell modules 60 are compressed in the layering direction S, the third seal member 85 deforms. This seals the first flow channel 83 and the second flow channel 84.

The supporting members 90 for a bearing force acting in the layering direction S are disposed between adjacent frames 30 in the cell module 60. The supporting members 90 are disposed at positions contacting the frame section 31 of the frame 30. There is no particular limitation upon the material of the supporting members 90; a thermoset adhesive can be used, as in the case of the bonding members 70.

As viewed from above in a layering direction S in which the cell modules 60 are layered, the supporting members 90 overlap at least a part of a section of the inter-cell module seal member 80 that contacts the cell modules 60. The supporting members 90 overlap at least part of the inter-cell module seal member 80 in the widthwise direction (indicated by arrow w in FIG. 5). The fuel cell stack 10 is compressed in the direction in which the cell modules 60 are layered. Reaction force from the inter-cell module seal member 80 is borne at this time by the supporting members 90 disposed within the cell modules 60.

Next, the operation of the present embodiment will be described.

The fuel cell stack 10 is assembled by layering a plurality of cell modules 60 formed in advance by layering a plurality of fuel cell units 20. If one of the fuel cell units 20 has a defect of some sort, the fuel cell unit 20 within the cell module 60 cannot be used, but this will not render all of the fuel cell units 20 in the fuel cell stack 10 unusable. Thus, the method of assembling a fuel cell stack 10 from layered cell modules 60 used in the present embodiment allows for a better material yield than a method in which the fuel cell stack is assembled in one step by sequentially layering a plurality of fuel cell units.

The cell module 60 is formed from eight layered fuel cell units 20. During layering, the adhesive constituting the bonding members 70, the adhesive constituting the supporting members 90, and the adhesive constituting the second seal members 58 are each applied. Specifically, the adhesive constituting the bonding members 70 is applied between the projecting sections 32 of adjacent frames 30. The adhesive constituting the supporting members 90 is applied at a position between adjacent frames 30 contacting the frame sections 31 of the frames 30. The adhesive constituting the supporting members 90 is applied at a position overlapping at least part of a section of the inter-cell module seal member 80 contacting the cell modules 60 as viewed from above in the layering direction S in which the cell modules 60 are layered. The adhesive constituting the second seal members 58 is applied between adjacent anode separators 51 and cathode separators 52. Similar adhesives are used for the adhesive constituting the bonding members 70, the adhesive constituting the supporting members 90, and the adhesive constituting the second seal members 58.

The adhesives are cured while compressing the cell module 60 in the direction in which the fuel cell units 20 are layered. This causes the projecting sections 32 of adjacent frames 30 in the cell module 60 to be joined together by the bonding members 70. The supporting members 90 are disposed at positions between adjacent frames 30 contacting the frame sections 31 of the frames 30. Adjacent anode separators 51 and cathode separators 52 in the cell module 60 are joined by the second seal members 58. The bonding members 70, supporting members 90, and second seal members 58 are formed by curing similar adhesives. This reduces the different types of adhesive used and allows a shared applicator device to be used, facilitating the formation of the bonding members 70, the supporting members 90, and the second seal members 58. In this way, the cell modules 60 are formed in advance.

When the plurality of cell modules 60 are layered, the inter-cell module seal member 80 is disposed between the cell modules 60. The inter-cell module seal member 80 is attached to the outer circumferential section of the plate member 81, allowing the inter-cell module seal member 80 to be handled more easily and facilitating the assembly of the fuel cell stack 10. The supporting members 90 overlap at least part of a section of the inter-cell module seal member 80 contacting the cell modules 60 as viewed from above in the layering direction S in which the cell modules 60 are layered.

The first flow channel 83 between the anode separator 51 and the plate member 81 and the second flow channel 84 between the cathode separator 52 and the plate member 81 are formed when the cell modules 60 are layered with the inter-cell module seal member 80 interposed therebetween. The first and second flow channels 83, 84 are used as coolant flow channels through which coolant flows.

When the necessary number of cell modules 60 have been layered, completing the formation of the layered assembly 61, the insulating plates 101 and the end plates are sequentially disposed at both ends of the layered assembly 61 in the layering direction S. The pair of end plates 102 is held in place by a pair of tension plates 105. The respective fuel cell units 20 contained in the cell modules 60 are thus compressed in the layering direction S. When the cell modules 60 are compressed in the layering direction S, the third seal member 85 that is disposed on the plate member 81 deforms, sealing the first flow channel 83 and the second flow channel 84. The guide plates 107 are then disposed at lateral positions between the pair of tension plates 105. The fuel cell stack 10 is thus assembled.

As viewed from above in the layering direction S in which the cell modules 60 are layered, the supporting members 90 of the fuel cell stack 10 overlap at least a part of a section of the inter-cell module seal member 80 that contacts the cell modules 60. The fuel cell stack 10 is compressed in the direction in which the cell modules 60 are layered. Reaction force from the inter-cell module seal member 80 is borne at this time by the supporting members 90 disposed within the cell modules 60. This allows for the prevention of deformation in the fuel cell units 20 in the cell modules 60 of the fuel cell stack 10 assembled by layering a plurality of cell modules 60, even when subjected to reaction force from the inter-cell module seal member 80.

The thickness t1 of the projecting section 32 of the frame 30 with respect to the layering direction S is less than the thickness t2 of the fuel cell unit 20 with respect to the layering direction S. The projecting sections 32 of adjacent frames 30 do not directly contact each other, and the frames 30 of adjacent fuel cell units 20 do not interfere with each other. Thus, there is no reduction in contact pressure between the fuel cell units 20 or degradation in power generation capability.

The frame section 31 of the frame 30 holds the outer circumference of the membrane electrode assembly 40, and the frame section 31 and the separators 51, 52 are joined by the first seal members 57. This keeps water vapor formed within the membrane electrode assembly 40 from passing between the frame 30 and the separators 51, 52. In addition, because the interior and exterior of the cell module 60 are segregated by the bonding members 70, there is no leakage of water vapor to the exterior even if slight amounts of water vapor pass between the frame 30 and the separators 51, 52.

When the fuel cell is generating power, the electrolyte membrane 43 of the membrane electrode assembly 40 becomes wet, and the cell module 60 swells in the layering direction S. Because the spaces between the projecting sections 32 of adjacent frames 30 within the cell module 60 are filled by the bonding members 70, the bonding members 70 deform so that, when the cell module 60 is displaced in the layering direction S, the frames 30 conform to this displacement in the layering direction S. This eliminates undue stress from acting upon the frames 30, minimizing the formation of cracks in the frames 30. As a result, there is no leakage of water vapor to the exterior of the cell module 60.

As described above, the fuel cell stack 10 of according to one embodiment is a fuel cell stack 10 assembled by layering a plurality of cell modules 60 formed in advanced by layering a plurality of fuel cell units 20, and the supporting members 90 overlap at least part of the section of the inter-cell module seal member 80 contacting the cell modules 60 as viewed from above in the layering direction S in which the cell modules 60 are layered. When the fuel cell stack 10 is compressed in the direction in which the cell modules 60 are layered, reaction force from the inter-cell module seal member 80 is borne by the supporting members 90 disposed within the cell modules 60, allowing deformation of the fuel cell units 20 in the cell modules 60 to be prevented even when subjected to reaction force from the inter-cell module seal member 80.

Because the bonding members 70 and the supporting members 90 are formed by curing similar adhesives, the number of types of adhesive used can be reduced and a shared applicator device can be used, facilitating the formation of the bonding members 70 and the supporting members 90.

The inter-cell module seal member 80 is attached to the outer circumferential section of the plate member 81, allowing the inter-cell module seal member 80 to be handled more easily and facilitating the assembly of the fuel cell stack 10.

The fuel cell stack 10 further comprises first seal members 57 separated from the inter-cell module seal member 80 and includes an adhesive forming a seal between the frames 30 and the separators 51, 52. Apart from functioning as seals, the first seal members 57 are capable of minimizing deformation in the fuel cell stack 10 due to the hardening of the adhesive.

The fuel cell stack 10 further comprises second seal members 58 constituted by an adhesive forming a seal between adjacent anode separators 51 and cathode separators 52 in the cell modules 60. Apart from functioning as seals, the second seal members 58 are capable of minimizing deformation in the fuel cell stack 10 due to the hardening of the adhesive.

The fuel cell stack 10 further comprises a third seal member 85 that is disposed on the plate member 81 separately from the inter-cell module seal member 80 and includes an elastic material that seals the first flow channel 83 formed between the separator of one of two cell modules 60, 60 and the plate member 81 and the second flow channel 84 formed between the separator of the other cell module and the plate member 81. The separator of the one cell module 60 is, for example, the anode separator 51 positioned in the bottommost layer of the cell module 60 shown in the upper half of FIG. 5, and the separator of the other cell module is the cathode separator 52 positioned in the topmost layer of the cell module 60 shown in the lower half of FIG. 5. Apart from functioning as a seal, the third seal member 85 is capable of absorbing deformation in the fuel cell stack 10 through deformation of the elastic material.

Embodiment 2

Figure 6:
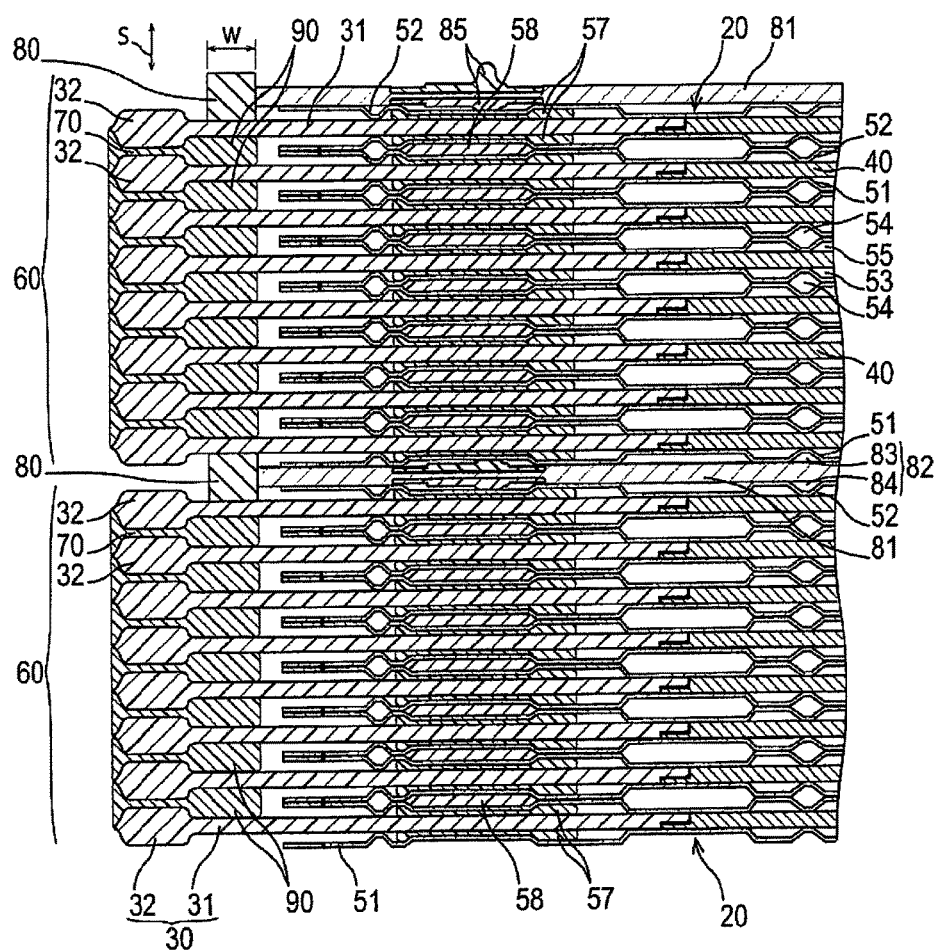
FIG. 6 is a sectional view of the main parts of a fuel cell stack according to a second Embodiment.

FIG. 6 is a sectional view of the main parts of a fuel cell stack 10 according to one embodiment. Members shared with the embodiment discussed above are labeled with identical reference numerals, and description thereof will be partially omitted.

In this embodiment, as in the embodiment discussed above, the bonding members 70 and the supporting members 90 are formed by curing similar adhesives. However, this embodiment differs from the embodiment discussed above, in which the bonding members 70 and the supporting members 90 are separately formed, in that the bonding members 70 and the supporting members 90 are integrally formed.

In this embodiment, when layering the fuel cell units 20 to form the cell module 60, the adhesive constituting the bonding members 70 and the supporting members 90 is applied from the ends of the projecting sections 32 of the frames 30 to the frame sections 31 of the frames 30. The adhesive is applied up to a position overlapping at least part of a section of the inter-cell module seal member 80 contacting the cell modules 60 as viewed from above in the layering direction S in which the cell modules 60 are layered.

The adhesive constituting the bonding members 70 and the supporting members 90 is cured while the cell module 60 is compressed in the direction in which the fuel cell units 20 are layered. The projecting sections 32 of adjacent frames 30 in the cell module 60 are joined to each other by the bonding members 70, and the supporting members 90 are disposed at positions contacting the frame sections 31 of the frames 30. The bonding members 70 and the supporting members 90 are thus integrally formed by curing similar adhesives.

Because the bonding members 70 and the supporting members 90 are integrally formed, the bonding members 70 and the supporting members 90 can be formed simultaneously. This simplifies the processes of applying and curing the adhesive, further facilitating the formation of the bonding members 70 and the supporting members 90.

As discussed above, the fuel cell stack 10 of this embodiment exhibits the following effects in addition to the effects yielded by the embodiment discussed above. Because the bonding members 70 and the supporting members 90 are integrally formed, the bonding members 70 and the supporting members 90 can be simultaneously formed, simplifying the processes of applying and curing the adhesive, and thereby further facilitating the formation of the bonding members 70 and the supporting members 90.

Other Embodiments

The present invention is not limited to the embodiments described above, and various modifications may be made thereto. For example, the foregoing description features cell modules 60 comprising eight layered fuel cell units 20, but the invention is not limited thereto. The present invention can be applied to a cell module 60 comprising at least two layered fuel cell units 20.

In the embodiments described above, the inter-cell module seal member 80 is attached to the outer circumferential section of a plate member 81, but the plate member 81 may be omitted. In such an arrangement, when layering two cell modules 60 with the inter-cell module seal member 80 interposed therebetween, the anode separator 51 positioned on an outermost layer of one cell module 60 and the cathode separator 52 positioned on an outermost layer of the other cell module 60 are directly joined together.

In the embodiment described above, a fluid flow channel 82 is formed between cell modules 60, and the inter-cell module seal member 80 is also made to function as a seal member for sealing the fluid flow channel 82, but the space between adjacent cell modules 60 need not be used as a fluid flow channel 82.

In the embodiment described above, supporting members 90 are disposed between all of the adjacent eight frames 30 in the cell module 60 (at seven locations), but the invention is not limited to such an arrangement. It is acceptable to dispose supporting members 90 between only some of the frames 30 as long as it is possible to bear reaction force from the inter-cell module seal member 80 and minimize deformation of the fuel cell units 20 in the cell module 60.

The supporting members 90 may be of identical or different sizes.

The supporting members 90 are not limited to being continuously disposed along the direction in which the inter-cell module seal member 80 extends. The supporting members 90 may be intermittently disposed along the direction in which the inter-cell module seal member 80 extends with spaces therebetween as long as it is possible to bear reaction force from the inter-cell module seal member 80 and minimize deformation of the fuel cell units 20 in the cell module 60.

In the example described above, similar adhesives were used for the adhesive constituting the bonding members 70, the adhesive constituting the supporting members 90, and the adhesive constituting the second seal members 58, but the use of different types of adhesive is not excluded.

In the embodiment described above, the adhesive constituting the bonding members 70 and the adhesive constituting the supporting members 90 are applied when the fuel cell units 20 are layered, but the present invention is not limited to such an arrangement. For example, an embodiment in which the adhesive forming the supporting members 90 is applied when the fuel cell units 20 are being layered and the adhesive constituting the bonding members 70 is injected into the gaps between the outer circumferential sections of the frames 30 after the fuel cell units 20 have been layered is also acceptable. In another acceptable embodiment, after the fuel cell units 20 have been layered, the adhesive constituting the supporting members 90 may first be injected into the gaps between the frames 30, followed by the adhesive constituting the bonding members 70 being injected into the gaps between the frames 30. If the bonding members 70 and the supporting members 90 are integrally formed by curing similar types of adhesive, as in the case of the second embodiment described above, a single type of adhesive constituting the bonding members 70 and the supporting members 90 may be injected into the gaps between the frames 30 after the fuel cell units 20 have been layered. If adhesive is injected into the gaps between the frames 30, the position and amount of injection can be controlled to form bonding members 70 and supporting members 90 of suitable sizes at desired locations.

The invention claimed is:
1. A fuel cell stack comprising:
 a plurality of cell modules, each cell module of the plurality of cell modules comprising at least two layered fuel cell units, each fuel cell unit of the least two layered fuel cell units including a membrane electrode assembly, a frame, and a pair of separators, the mem- brane electrode assembly of each of the fuel cell units being integrally formed with the frame, the membrane electrode assembly and the frame being sandwiched between the pair of separators, the frame being electrically insulating;

bonding members for joining outer circumferential sections of adjacent ones of the frames in the fuel cell units;

a plate member provided between adjacent ones of the cell modules;

at least one inter-cell module seal member disposed between the adjacent ones of the cell modules, the at least one inter-cell module seal member being attached to an outer circumferential section of the plate member, the inter-cell module seal member contacting and forming a seal between the cell modules; and supporting members disposed between the adjacent ones of the frames in the fuel cell units, the supporting members at least partially overlapping the at least one inter-cell module seal member when viewed along a direction in which the cell modules are layered, at least a portion of each of the supporting members spanning an entire gap between the respective adjacent frames along the direction in which the cell modules are layered, the supporting members not physically contacting the separators, each of the frames including a projecting section and a frame section, the projecting section being disposed on the outer circumferential section of the frame and configured to protrude in two opposite directions parallel to the layering direction, the frame section being positioned farther inward than the projecting section, each of the bonding members being disposed between the projecting sections of adjacent ones of the frames, and each of the supporting members being disposed between the frame sections of adjacent ones of the frames, the at least one inter-cell module seal member directly contacting a portion of each of the frame sections of respective adjacent ones of the fuel cell units of the adjacent ones of the cell modules, the portions of the frame sections where the at least one inter-cell module cell member contacts being at least partially overlapped with the supporting members when viewed along a direction in which the cell modules are layered, the at least one inter-cell module seal member and the outer circumferential section of the plate member being disposed inward of the projecting sections.

2. The fuel cell stack according to claim 1, wherein the bonding members and the supporting members are integrally formed.

3. The fuel cell stack according to claim 1, wherein the bonding members and the supporting members are formed by curing identical adhesives.

4. The fuel cell stack according to claim 1, further comprising
a plurality of first seal members disposed separately from the at least one inter-cell module seal member, each of the first seal members including an adhesive that forms a seal between one of the frames and an adjacent one of the separators.

5. The fuel cell stack according to claim 1, further comprising
a plurality of second seal members, each of the second seal members including an adhesive forming a seal between a pair of adjacent ones of the separators.

6. The fuel cell stack according to claim 1, further comprising
a pair of third seal members disposed on the plate member separately from the at least one inter-cell module seal member, one of the third seal members including an elastic material that seals a first flow channel formed between the separator of one of two cell modules and the plate member and the other of the third seal members including an elastic material that seals a second flow channel formed between the separator of the other cell module and the plate member.

7. The fuel cell stack according to claim 2, wherein the bonding members and the supporting members are formed by curing identical adhesives.

8. The fuel cell stack according to claim 2, further comprising
a plurality of first seal members disposed separately from the at least one inter-cell module seal member, each of the first seal members including an adhesive that forms a seal between one of the frames and an adjacent one of the separators.

9. The fuel cell stack according to claim 3, further comprising
a plurality of first seal members disposed separately from the at least one inter-cell module seal member, each of the first seal members including an adhesive that forms a seal between one of the frames and an adjacent one of the separators.

10. The fuel cell stack according to claim 2, further comprising
a plurality of second seal members, each of the second seal members including an adhesive forming a seal between a pair of adjacent ones of the separators.

11. The fuel cell stack according to claim 3, further comprising
a plurality of second seal members, each of the second seal members including an adhesive forming a seal between a pair of adjacent ones of the separators.

12. The fuel cell stack according to claim 4, further comprising
a plurality of second seal members, each of the second seal members including an adhesive forming a seal between a pair of adjacent ones of the separators.

13. The fuel cell stack according to claim 1, wherein the plate member is positioned between a bottommost separator of one of the adjacent ones of the cell modules and a topmost separator of the other of the adjacent ones of the cell modules.

14. The fuel cell stack according to claim 13, wherein the at least one inter-cell module seal member is disposed between the projecting sections and the outer circumferential section of the plate member.

15. The fuel cell stack according to claim 13, wherein the at least one inter-cell module seal member is disposed between the projecting sections and outer circumferential sections of the bottommost separator and the topmost separator.

16. The fuel cell stack according to claim 13, wherein the plate member extends between the frame sections and the membrane electrode assemblies of the adjacent ones of the cell modules.

17. The fuel cell stack according to claim 1, wherein the bonding members are not provided between adjacent ones of the projecting sections of adjacent ones of the cell modules such that a gap exists on an outward side of the inter-cell module seal members.

* * * * *